United States Patent
Sinz et al.

(10) Patent No.: US 6,276,342 B1
(45) Date of Patent: Aug. 21, 2001

(54) FUEL SUPPLY SYSTEM

(75) Inventors: Wolfgang Sinz, Sulzbach; Karl Eck, Frankfurt; Michael Teichert, Schwalbach, all of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/370,418

(22) Filed: Aug. 9, 1999

(30) Foreign Application Priority Data

Aug. 10, 1998 (DE) .................................... 198 36 058
Jul. 10, 1999 (DE) .................................... 199 32 356

(51) Int. Cl.$^7$ .................................................. F02M 37/04
(52) U.S. Cl. ................... 123/514; 123/509; 137/565.29; 137/118.01
(58) Field of Search ................ 137/565.29, 565.32, 137/565.33, 118.01, 255; 123/509, 514, 198 D

(56) References Cited

U.S. PATENT DOCUMENTS

| | | | |
|---|---|---|---|
| 4,170,279 | * 10/1979 | Pelletier | 137/118.01 |
| 4,291,532 | * 9/1981 | Robinson | 60/223 |
| 4,620,568 | * 11/1986 | Sumerford et al. | 137/899.4 |
| 4,683,864 | * 8/1987 | Bucci | 123/575 |
| 4,718,827 | * 1/1988 | Sutton et al. | 417/244 |
| 4,860,714 | 8/1989 | Bucci | 123/514 |
| 5,070,849 | * 12/1991 | Rich et al. | 123/509 |
| 5,111,844 | 5/1992 | Emmert et al. | 137/574 |
| 5,197,443 | * 3/1993 | Hodgkins | 123/514 |
| 5,197,444 | * 3/1993 | Lang et al. | 123/514 |
| 5,435,691 | * 7/1995 | Braun et al. | 415/55.6 |
| 5,732,684 | * 3/1998 | Thompson | 123/514 |
| 5,743,239 | * 4/1998 | Iwase | 123/514 |
| 5,855,197 | * 1/1999 | Kato | 123/516 |
| 6,123,511 | * 9/2000 | Sertier | 417/87 |

FOREIGN PATENT DOCUMENTS

| | | |
|---|---|---|
| GM7404007 | 2/1974 | (DE) . |
| 2440905A1 | 3/1976 | (DE) . |
| 3915185C1 | 10/1990 | (DE) . |
| 4212698A1 | 12/1991 | (DE) ............... F02M/37/18 |
| 4121320C1 | 7/1992 | (DE) . |
| 4111341A1 | 10/1992 | (DE) . |

OTHER PUBLICATIONS

332 / Research Disclosure, May 1993, Fuel Pump and Reservoir (Horizontally Mounted), May 1993, No. 349.
Pub. No. 0308155 Apr. 5, 1991, Japan.

* cited by examiner

*Primary Examiner*—Carl S. Miller
(74) *Attorney, Agent, or Firm*—David M. Thimmig; Mayer Brown & Platt

(57) ABSTRACT

A fuel supply system for a motor vehicle has two feed units arranged in a fuel tank. The feed units in each case feed fuel out of baffles to an internal combustion engine of the motor vehicle and to suction jet pumps. This ensures a reliable supply of fuel to the internal combustion engine, even in the case of a very high fuel requirement and in the case of an angled design of the fuel tank.

16 Claims, 2 Drawing Sheets

FUEL SUPPLY SYSTEM

BACKGROUND OF THE INVENTION

The invention relates to a fuel supply system for feeding fuel to an internal combustion engine of a motor vehicle by means of a feed unit arranged in a fuel tank.

In such fuel supply systems, the feed unit is usually fastened to a holding part inserted into an orifice of the fuel tank and projects into a baffle of the motor vehicle. In present-day fuel tanks which mostly have an angled or saddle shape, suction jet pumps are arranged in the regions distant from the feed unit. These suction jet pumps are driven by the feed unit and feed fuel into the baffle. The delivery of the feed unit depends on the number and size of the suction jet pumps and on the requirements of the internal combustion engine as regards feed pressure and feed volume.

A disadvantage of the known fuel supply system is that, for a particularly high-performance internal combustion engine or for an especially angled fuel tank with a plurality of suction jet pumps, the feed unit has to have a very high rating. As a result, the feed unit requires a high power consumption and large dimensions. Furthermore, a total of two hoses have to be laid in the fuel tank in order to operate a single suction jet pump. Particularly where angled fuel tanks are concerned, the laying of the hoses and the mounting of the suction jet pumps are therefore highly cost-intensive.

SUMMARY OF THE INVENTION

The problem on which the invention is based is to design a fuel supply system of the type initially mentioned, in such a way that it can be used in the case of angled fuel tanks and for particularly high-performance internal combustion engines and, at the same time, is designed as cost-effectively as possible.

This problem is solved, according to the invention, by means of a second feed unit arranged in the fuel tank.

By virtue of this design, the fuel supply system according to the invention requires at least one suction jet pump fewer than the known fuel supply system. This leads to a reduction in the number of hoses to be laid in the fuel tank. Since the volume flows of the feed units are added together, low-delivery feed units can be used, even for high-performance internal combustion engines, as a consequence of the invention. The low-delivery feed units require in each case a low power consumption and therefore cost-effective electric connecting lines. Furthermore, the feed units, because of their small dimensions, can be used in especially angled fuel tanks and be mounted through correspondingly small mounting orifices in the fuel tank.

The second feed unit may, according to an advantageous development of the invention, be used as a simple-to-mount replacement for a suction jet pump if the second feed unit is designed to operate at least one suction jet pump feeding fuel into a baffle of the first feed unit.

According to another advantageous development of the invention, it is possible to ensure that baffles of the feed units are emptied uniformly, if each of the feed units is connected to a suction jet pump and if the suction jet pumps are designed to feed into baffles of the other feed unit in each case.

According to another advantageous development of the invention, a contribution is made to making the filling of the baffles even more uniform if a return line leading back from a pressure regulator is led into the baffles of the two feed units.

In a further advantageous refinement, a float valve is arranged in each of the return lines leading into the baffles. The return flow of the fuel can be controlled by means of these float valves. In some driving situations, it may happen that fuel accumulates in only one of the chambers of the fuel tank. In addition, without the float valves, the fuel coming from the return would flow preferentially to the baffle which is arranged in this chamber and which is already filled. This may give rise to the critical situation where the feed unit arranged in the other chamber no longer feeds sufficient fuel into the forward-flow line and the forward-flow pressure thereupon breaks down. This situation is avoided by the arrangement of the float valves. Due to the high fuel level, the float valve in the filled chamber closes that part of the return line which leads into this baffle, whilst the float valve in the other part of the return line is open. All the fuel in the return of the feed unit is therefore routed into the empty chamber and a sufficient supply of fuel to both feed units is ensured.

It is also advantageous if the two suction jet pumps feed into a common line which is subsequently apportioned to the two baffles. The arrangement of a float valve in each of the common lines leading to the baffles makes it possible to control the feed flow of the suction jet pumps in a similar way to the return flow.

According to another advantageous development of the invention, a parallel connection of the feed units requires a particularly low outlay in terms of construction if the feed units each have a feed line leading to the forward-flow line. Two structurally identical feed units may thereby be used, so that series manufacture of the fuel supply system according to the invention becomes particularly cost-effective.

According to another advantageous development of the invention, it is possible to avoid the two feed units influencing one another if a nonreturn valve is arranged in each of the feed lines.

BRIEF DESCRIPTION OF THE DRAWINGS

The invention permits numerous embodiments. To make its basic principle even clearer, two of these are illustrated in the drawings and are described below.

DETAILED DESCRIPTION OF THE PREFERRED EMBODIMENTS

Figure 1:
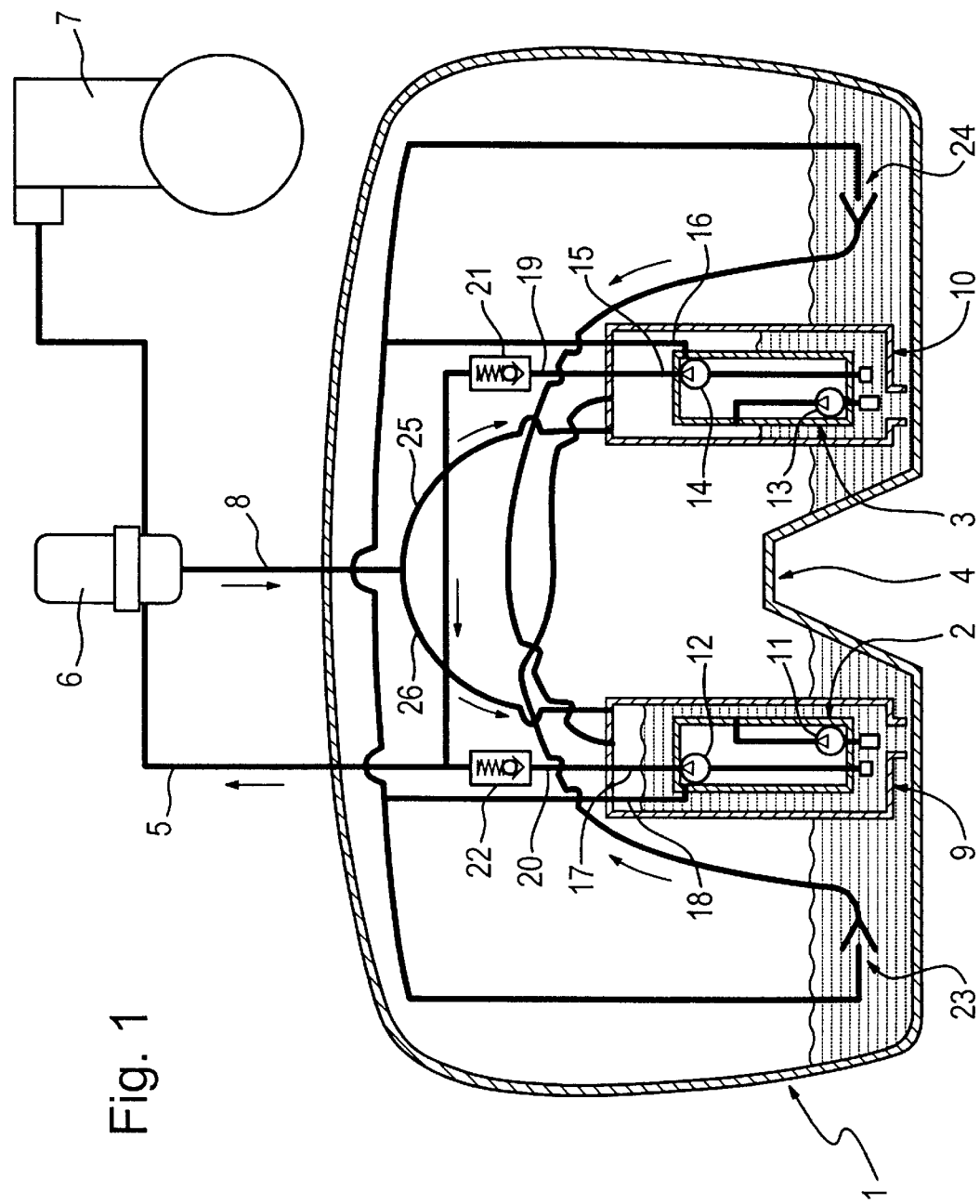
FIG. 1 shows a schematic representation of a fuel supply system according to the invention.

FIG. 1 shows diagrammatically a fuel supply system with two feed units 2, 3 arranged in a fuel tank 1. The fuel tank 1 has a saddle 4. A forward-flow line 5 leads from the fuel tank 1 via a pressure regulator 6 to an internal combustion engine 7. Connected to the pressure regulator 6 is a return line 8 led into the fuel tank 1.

The feed units 2, 3 in each case suck fuel out of the respective baffles 9, 10 and feed the fuel, by means of two fuel pumps 11–14, to two outlets 15–18. Connected in each case to one of the outlets 15, 17 of the respective feed units 2, 3 are feed lines 19, 20 leading in each case to the forward-flow line 5 and having respective non return valves 21, 22. The feed units 2, 3 are thereby connected in parallel. The nonreturn valves 21, 22 prevent the feed units 2, 3 from influencing one another. The other outlet 16, 18 of the feed units 2, 3 in each case is connected to two suction jet pumps 23, 24 arranged in the fuel tank 1. The suction jet pumps 23, 24 feed fuel out of the fuel tank 1 to the baffles 9, 10 located opposite in each case. This ensures that, even when the motor vehicle is traveling around relatively long bends or on hills, the baffles 9, 10 of the feed units 2, 3 are constantly filled with fuel from all regions of the fuel tank 1. Furthermore, the return line 8 is divided, within the fuel tank 1, into two portions 25, 26 leading in each case to the baffles 9, 10. The two baffles 9, 10 are thereby filled uniformly with fuel.

Figure 2:
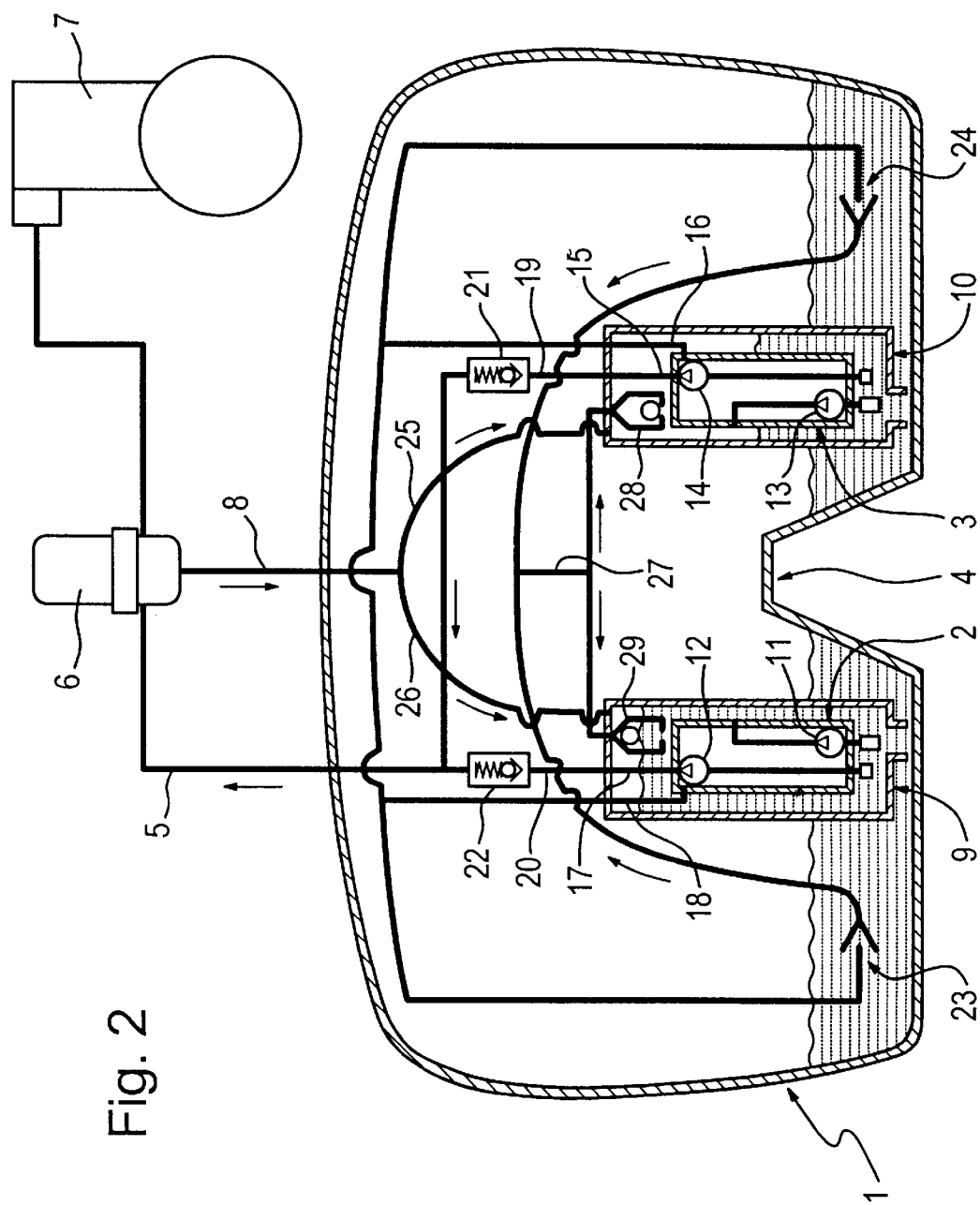
FIG. 2 shows a schematic representation of a second embodiment of a fuel supply system according to the invention.

FIG. 2 shows a fuel supply system having a basic design like that in FIG. 1. The only difference is a common line 27 feeding into the baffles 9, 10 from the two suction jet pumps 23, 24. Further along, the common line 27 is apportioned to the baffles 9, 10 of the feed units 2, 3. Each of these two lines is assigned a float valve 28, 29 in each case in the respective baffles 9, 10. The feed flow of the suction jet pumps 23, 24 can consequently be controlled as a function of the filling of the baffles 9, 10.

What is claimed is:

1. A fuel supply system for an internal combustion engine of a motor vehicle, said system comprising a fuel tank, a first and second feed unit arranged in the fuel tank, and wherein each of the feed units has a respective baffle and is connected to a respective suction jet pump, and wherein the suction jet pumps are connected to a common fuel line, wherein the common fuel line is connected to the baffles of the respective feed units, and wherein a float valve is arranged in each line connected to the baffles.

2. A fuel supply system for an internal combustion engine of a motor vehicle, said system comprising a fuel tank, a first and second feed unit arranged in the fuel tank, and wherein each of the feed units is connected to a respective suction jet pump, and wherein the suction jet pump connected to each respective feed unit is connected to a baffle of the other feed unit.

3. The fuel supply system as claimed in claim 2 further comprising a return line and a pressure regulator, wherein the return line is connected to the pressure regulator and each of the respective baffles of the feed units.

4. The fuel supply system as claimed in claim 1 further comprising a return line and a pressure regulator, wherein the return line is connected to the pressure regulator and each of the respective baffles of the feed units.

5. The fuel supply system as claimed in claim 3, wherein a float valve is arranged in each line connected to the baffles.

6. The fuel supply system as claimed in claim 4, wherein a float valve is arranged in each line connected to the baffles.

7. A fuel supply system for an internal combustion engine of a motor vehicle, said system comprising a fuel tank, a first and second feed unit arranged in the fuel tank, a feed line connected to each respective feed unit and a forward-flow line connected to each of the respective feed lines, and wherein the second feed unit is adapted to operate at least one suction jet pump connected to a baffle of the first feed unit.

8. The fuel supply system as claimed in claim 2 further comprising a feed line connected to each respective feed unit and a forward-flow line connected to each of the respective feed lines.

9. The fuel supply system as claimed in claim 1 further comprising a feed line connected to each respective feed unit and a forward-flow line connected to each of the respective feed lines.

10. The fuel supply system as claimed in claim 5 further comprising a feed line connected to each respective feed unit and a forward-flow line connected to each of the respective feed lines.

11. The fuel supply system as claimed in claim 6 further comprising a feed line connected to each respective feed unit and a forward-flow line connected to each of the respective feed lines.

12. The fuel supply system as claimed in claim 9, wherein a nonreturn valve is arranged in each of the feed lines.

13. The fuel supply system as claimed in claim 8, wherein a nonreturn valve is arranged in each of the feed lines.

14. The fuel supply system as claimed in claim 9, wherein a nonreturn valve is arranged in each of the feed lines.

15. The fuel supply system as claimed in claim 10, wherein a nonreturn valve is arranged in each of the feed lines.

16. The fuel supply system as claimed in claim 11, wherein a nonreturn valve is arranged in each of the feed lines.

* * * * *